June 28, 1966     S. C. LAWRENCE, JR     3,257,841
PAINT STRIPPING SYSTEM
Filed March 8, 1961     2 Sheets-Sheet 1
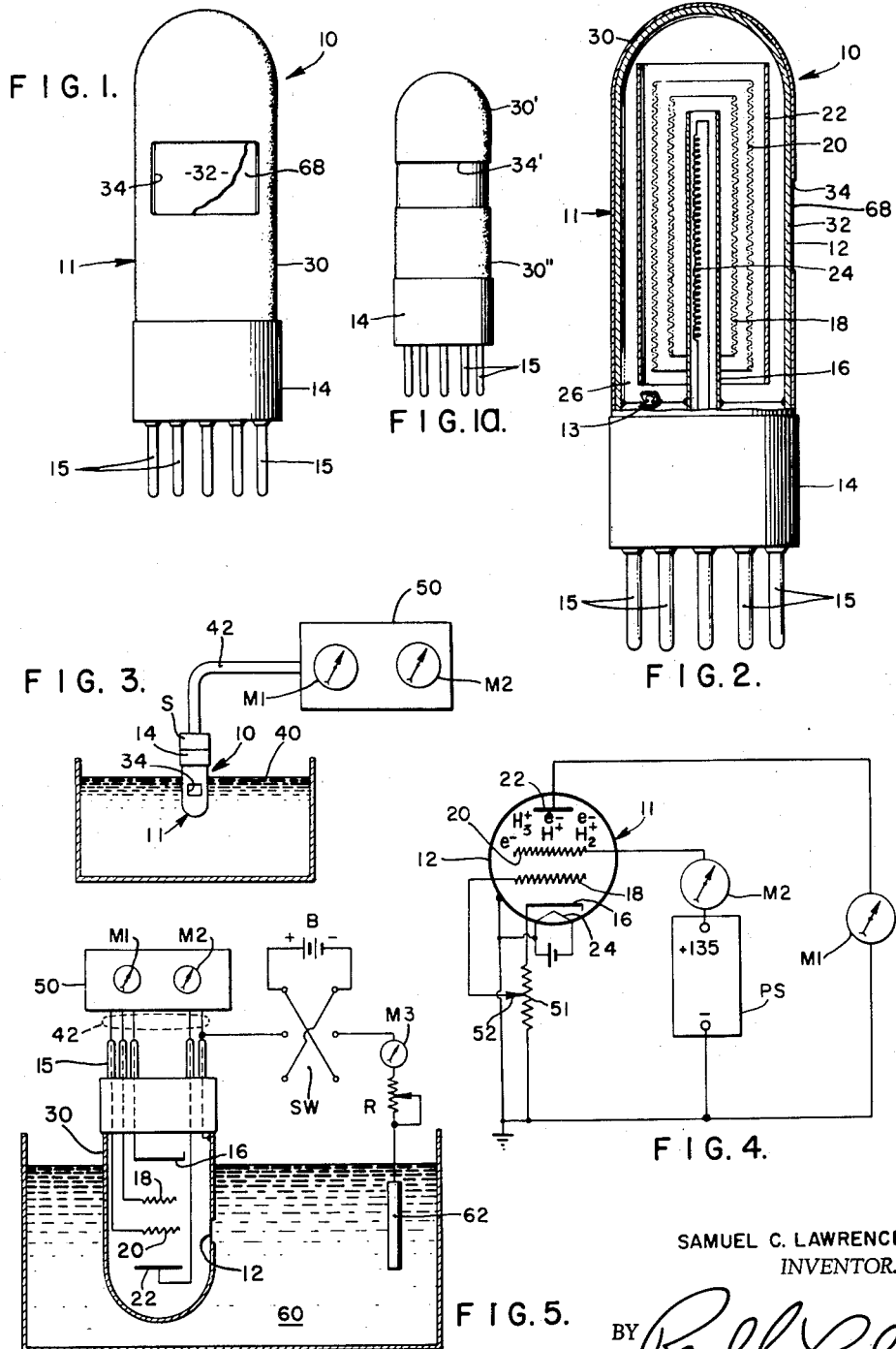
SAMUEL C. LAWRENCE, JR.
INVENTOR.
BY
ATTORNEY.

June 28, 1966  S. C. LAWRENCE, JR  3,257,841
PAINT STRIPPING SYSTEM
Filed March 8, 1961  2 Sheets-Sheet 2

SAMUEL C. LAWRENCE, JR.
INVENTOR.

BY
ATTORNEY

United States Patent Office 3,257,841
Patented June 28, 1966

3,257,841
PAINT STRIPPING SYSTEM
Samuel C. Lawrence, Jr., 1814 S. 142nd Place,
Seattle, Wash.
Filed Mar. 8, 1961, Ser. No. 94,202
22 Claims. (Cl. 73—19)

This invention relates to methods and apparatus for testing of liquids having hydrogen-effusion properties and also to electronic equipment, including specially prepared electronic discharge devices, for use in testing such liquids. More particularly, the invention relates to methods and apparatus for testing of paint strippers in order to ascertain the hydrogen-effusion properties that they exhibit when used in stripping paint from metal objects, especially steel objects.

The following specification has in contemplation the treatment of both plated and unplated steel parts where hydrogen embrittlement may result in the development of dangerous conditions.

It is well known that many metals, especially steel, are embrittled by virtue of hydrogen contained in them. The phenomenon resulting in such embrittlement is called hydrogen embrittlement. Whether such gas is present in molecular form or atomic form or both, is still undetermined. Though there may be some question as to the form in which the hydrogen exists in the metal, the hydrogen that is present there may be referred to as dissolved or absorbed hydrogen.

Hydrogen that causes embrittlement of metal may enter the metal in various ways. For example, hydrogen may enter a piece of metal while the surface of the metal is being cleaned with a paint solvent. Hydrogen responsible for embrittlement may also enter metal during the course of oxidation of the metal surface that occurs while the metal is exposed to a humid atmosphere for a prolonged period.

The rate at which hydrogen can diffuse from a fluid into a metallic object can be measured to some degree of accuracy by submerging an electron discharge device, often referred to hereinafter simply as a tube, or vacuum tube, or electron discharge tube, or electronic tube, in the body of the fluid, and then determining the effect that such immersion has on the electronic characteristics of the tube. Phenomena of these types have previously been reported. See, for example, "Diffusion of Hydrogen From Water Through Steel" by Francis J. Norton, Journal of Applied Physics, vol. 11, p. 262 ff., April 1940. See also United States Patent No. 2,526,038, issued to Herbert Nelson; United States Patent No. 2,790,324, issued to Maynard A. Babb; and United States Patent No. 2,921,210 issued to Edward Schaschl et al.

In such prior art devices, the electronic tube has been in the form of a diode, or triode, or a tetrode. Regardless of differences in structure between tubes, in accordance with the accepted theory of operation, the partial pressure of hydrogen within the envelope of the tube is increased while the tube is immersed in the fluid under investigation. This increase in pressure may be attributed to the migration of hydrogen ions through the wall of the tube shell to the interior surface thereof where the hydrogen ions combine with electrons in the tube wall to form hydrogen gas. The rate of diffusion depends not only on the diffusion and desorption characteristics of the wall but also upon the effusion properties of the fluid in which the tube is immersed. Since the effusion property depends upon the fact that the fluid is in contact with the wall of a metal object, it is sometimes referred to hereinafter as the hydrogen-effusion-into-metal characteristic of the fluid.

In the specification the terms "effusion," "diffusion," "permeation," and "desorption" have been employed to describe various phenomena that affect the flow of hydrogen from a body of liquid through the shell of a probe into the space within the shell. The effusion property refers to a property of the liquid. It represents the ability of the liquid to supply hydrogen to the external surface of a probe or to the external surface of a solid object that is immersed in a liquid. This ability may be due to electrical characteristics, chemical characteristics, or others. The term "diffusion" refers to the migration of hydrogen from one point to another within the material compising the shell of the probe or the object. The term "desorption" refers to the ability of a surface to cause hydrogen contained within the wall or within the object to emerge from the surface in gaseous form. The term "permeation" refers to the over-all ability of a wall member to permit the flow of gas through the wall from the space on one side thereof external to the wall to the space on the other side thereof external to the wall. It is thus seen that in the flow of hydrogen from the liquid under test into the space within the shell of the probe, the hydrogen effuses from the liquid through the external surface of the shell into the body of the shell. There the hydrogen diffuses to the internal surface of the shell. At this point the hydrogen is desorbed thereby forming a gaseous atmosphere within the shell. The permeability of the shell depends upon the diffusion characteristics of the shell material and also the desorption characteristics of the internal surface, and also on the nature of the interaction between the external surface and the fluid undergoing investigation. The term "sorb" is used to include either absorption or adsorption or both.

The principal object of this invention is to provide a method and apparatus for identifying paint stripper solutions which may be satisfactorily used in removing paints from objects composed of metals, such as steel, which are subject to hydrogen permeation and subsequent hydrogen embrittlement when subjected to treatment with paint stripping solutions that possess high hydrogen-effusion characteristics.

Beside the principal object of the invention of determining in general the paint strippers which may be used for removing paint from plated or unplated steel parts, it is a further object of the invention to provide for testing, by means of electronic vacuum tubes, stripping solutions which are useful for removing paints from unplated steel parts, and also for removing paints from plated steel parts, so that stripping solutions can be chosen for employment in the stripping of paints from such steel parts without hydrogen sorption in such a degree as to cause embrittlement.

It is also an object of the invention to provide a system for determining the hydrogen effusion properties of various paint stripping solutions by measuring the extent of hydrogen permeation through the wall of the steel or other metal shell of a vacuum tube.

It is an additional object to provide a system for preparing the shell of a vacuum tube employed in such a measuring process in such a way that the hydrogen sorption properties of the tube are similar to those of a steel part with which a paint stripper under investigation may be used.

A still further object of the invention is to provide a method for measuring the hydrogen effusion properties of paints and their components.

And another object of the invention is to provide a method for measuring the free amine content of chemical solutions, such as accelerators employed for accelerating the curing of epoxy paints.

In practicing the present invention an electronic tube, according to the form of invention at present considered the best, is used which possesses a homogeneous steel shell and is externally coated with hydrogen impermeable material which is omitted at one portion to leave an appropriate window of known surface area through which hydrogen may permeate into the tube. A 6V6 tube which has been found best to use for hydrogen detection up to the present time is a tetrode which includes an indirectly heated cathode, a collector plate remote from the cathode and an intervening inner grid and accelerator grid. Such a tube may be a gettered tube or a getterless tube, as hereinafter explained. The window may be a rectangular window or more desirably a cylindrical window encircling an intermediate portion of the tube. Such a window is submerged in the solution being tested, the base of the tube being held above the liquid level. The tube is connected with a measuring and control circuit for measuring the generated current and for recording certain selected phenomena occurring during the stripping process.

The forming of windows of predetermined area by coating such tubes not only has the advantage of making it possible to obtain comparative measurements with a series of tubes, but also improves the reliability of a single tube. For example, by partially coating a tube in accordance with this invention to form a window of predetermined area, reliable and reproducible measurements may be obtained with a single tube by immersing only the shell of the tube in a liquid under investigation while holding the base of the tube and the seal between the base and the shell above the surface of the liquid. When the tube is so supported in the liquid, the hydrogen flows into the tube from the liquid through a predetermined area of the shell.

For many purposes, it is best to employ vacuum tubes that have been evacuated by conventional techniques under which the envelopes are sealed against the atmosphere and in which gettering material is then evaporated onto a portion of the interior wall of the shell in order to absorb residual gas that otherwise might be present within the envelope. Such gettering material not only removes residual gases remaining in the tube when it is initially manufactured, but also performs the additional function of removing the hydrogen that enters the tube in the practice of this invention. In this way the calibration of the tube is stabilized, thus increasing the utility of forming windows to establish the sensitivity at a predetermined value. Furthermore, when using a tube including such gettering material, hydrogen and other gas are easily removed without the necessity of resorting to the use of pumping systems.

For most efficient operation the shells are coated with hydrogen-impermeable material over the areas of the envelopes opposite the deposits of gettering material that coat portions of the inside walls of such envelopes. In this way windows are formed opposite the portions of the envelope which are free of gettering material.

The invention possesses other features and advantages in addition to the foregoing, as will be apparent from a reading of the following specification taken in connection with the accompanying drawings wherein:

FIGURE 1 is an elevational view of a hydrogen probe used in connection with this invention;

FIG. 1a is a similar view indicating a cylindrical window rather than a rectangular window as seen in FIG. 1;

FIG. 2 is a longitudinal section of the probe of FIG. 1;

FIG. 3 is a diagrammatic view indicating one manner of utilizing the probe in the practice of this invention;

FIG. 4 is a schematic diagram of one form of circuit employable in making measurements of hydrogen diffusion rate in accordance with this invention;

FIG. 5 is an elevational schematic view, in vertical section, indicating apparatus of this invention and its manner of use;

Figure 6:
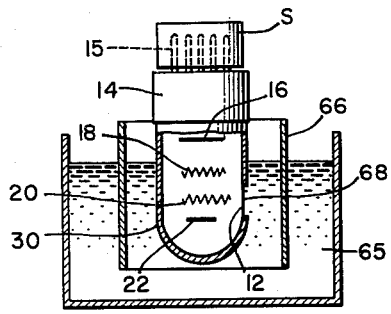
FIG. 6 is a cross-sectional diagram of apparatus employing the invention.
Figure 6A:
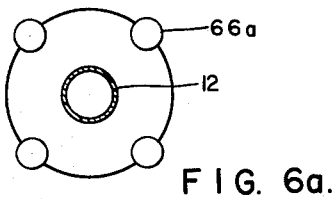
FIG. 6a is a schematic cross-sectional view of the apparatus of FIG. 6.

In FIGS. 1 and 2, there is shown a standard vacuum tube 10 known as 6V6 tube which has been modified for use with the present invention.

After preparation, as described below, the tube is painted with a paint to be investigated and then subjected to treatment with a paint stripper in order to ascertain the hydrogen-effusion properties of the paint stripper when in use. Comparative tests are made with various paints and various paint strippers on both plated and unplated tubes to facilitate ascertainment of the comparative hydrogen-effusion properties of various paint strippers. As a result of this invention, paint strippers free and nearly free of hydrogen-effusion properties can be identified.

The vacuum tube 10 is provided with an envelope 11 which comprises a metal shell 12 sealed to an insulating base 14. The shell 12 is formed of a metal such as steel which is permeable to hydrogen. Such a tube comprises an indirectly heated cathode 16, inner and outer grids 18, and 20, and a plate 22. All of the electrodes are of cylindrical configuration and they are supported concentrically within the envelope 11. Each of the electrodes 16, 18, 20 and 22 of the shell 12 is connected electrically with an external metallic prong-shaped terminal 15. The two terminals of the heater 24 mounted in contact with the cathode 16 also are electrically connected to two external terminal prongs.

In the conventional method of manufacturing such a tube, the envelope 11 is evacuated by means of a vacuum pump and then sealed off against the ingress of air. At the time of sealing, the pressure within the envelope may be about $10^{-2}$ or $10^{-4}$ mm. Hg. In order to improve the operation of such a tube, the interior space is further evacuated by the evaporation of a charge 13 of gettering material within the envelope. Such a gettering material may, for example, consist of barium salts in combination with salts of aluminum or berryllium which when evaporated (flashed) produce free barium, or other material capable of absorbing residual gas remaining in the envelope after sealing. Upon evaporation, such gettering material forms a localized deposit on the interior wall of the tube, such as the deposit 26 shown at the lower end of the tube 10 in FIG. 2.

As is well known, such gettering material absorbs residual gases contained within the envelope of such a vacuum tube, thereby reducing the gas pressure to a much lower value, such as to a pressure of $10^{-7}$ mm. Hg. In some cases, the deposit of gettering material is at the upper end of the tube, instead of at the lower end, as shown. In other cases, the deposit of gettering material is on the other side of the tube. In any event, during the course of manufacture of a series of tubes, the area covered by the deposit 26 of gettering material varies in a rather irregular manner from one tube to another. On the other hand, it is also possible to produce such high vacuums with special pumps or with getters that operate only when turned on, as with special auxiliary filaments. In such cases, gettering deposit masking on the tube surface is not necessary, but windows to control differences in gas permeation rates due to variations in shell structure or composition are required in order to give satisfactory results.

The outer wall of the shell 12 is coated with a hydrogen-impermeable layer 30 over a portion of the external surface thereof, but leaving a restricted portion 32 of the shell free of such coating material, thus forming a hydrogen-permeable, or hydrogen-pervious, window 34. The layer on the coated portion of the shell thus forms a barrier to the flow of hydrogen into the interior of the tube, while the uncoated portion forms a hydrogen-permeable window which permits the flow of hydrogen into the interior of the tube through the window 34.

In the best embodiment of the invention, the portion of the shell 12 opposite the deposit 26 of gettering material is coated with hydrogen-impermeable material, thereby locating the window 34 in an area of the shell which is free of gettering material, or at least has a small proportion of gettering material deposited thereon. In this way, maximum hydrogen permeability is achieved for a window of given size. Furthermore, irregular absorption of hydrogen by the gettering material that would otherwise occur if the hydrogen flowed through a portion of the shell opposite the coating 26 of gettering material is avoided. This not only makes it possible to form windows having predetermined hydrogen permeation characteristics in a series of tubes, but also preserves the life of the gettering material so that its gaseous absorption properties are preserved for a longer period. In this way, the gettering material is available for absorbing hydrogen gas from the space within the tube. In this connection, it will be understood that the hydrogen-gaseous atmosphere developed within the interior of the envelope due to the flow of hydrogen through the window 34 is gradually absorbed by the gettering material 26, until the gettering material has become saturated with hydrogen, or in other words, until the hydrogen absorption ability of the gettering material has been greatly reduced or exhausted.

It is not necessary for the window to have a rectangular shape as shown in FIG. 1. The window may have any other suitable shape and may, for example, be in the form of a cylindrical area 34' located between two areas 30' and 30" which have been coated with hydrogen impervious material as illustrated, for example, in FIG. 1a. In the latter case, for example, when using a 6V6 tube which has a shell diameter of 1 inch and a shell height of approximately 2 inches, the lower ¾ inch of the shell and the upper ½ inch of the shell are coated with hydrogen-impervious material thus leaving a cylindrical strip of about ¾ inch height which acts as a cylindrical window having an area of about 2 square inches. In some cases, especially when there is no gettering material at the outer, or upper, end of the shell, coating material may be applied only to the portion of the shell that is adjacent to the base.

There are a number of materials, such as natural or synthetic resins, which are impervious to hydrogen and which may be readily applied in the form of solutions by painting them onto the surface of the shell 12, or by dipping, or by spraying. In the case of dipping or spraying, the desired area for the window 34 may be conveniently masked, as by means of an adhesive masking tape useful for the purpose. For example, chemical masking tape may be used for this purpose during dipping. If such material is used, it is removed prior to use of the tube as a probe.

For best effects the masking material employed for forming the window is relatively insoluble compared with the paint to be tested with the paint strippers under investigation. In order to test many paints, the well-known epoxy resins, in solution form or in other appropriate liquid form, are suitable as are other known synthetic resins in solution or other satisfactory liquid form, such as the well-known vinyl paints which need not be baked. Other coating materials are baking-type black lacquer and so on.

An epoxy resin suitable for use in making a window is the epoxy resin known as Shell 1001. This resin has an epoxy equivalent of 500, that is, it has 500 epoxy groups per mole. To prepare such an epoxy resin for use as a coating material, it is dissolved in a suitable solvent such as butyl alcohol, butyl cellosolve, xylene, or toluene, or compatible mixtures thereof. Pigments may be added in order to color the tubes. Prior to application of such coating material a suitable catalyst is added for accelerating the hardening of the coating when it is applied. A tertiary amine adduct made from Shell 1001 and containing free amine groups is a suitable catalyst. After coating the probe the resin is normally cured for 3 hours at 300° F. Likewise when small quantities are applied to the edges of a window in order to alter the size of the window, it is cured by baking for 3 hours at 300° F. Such a coating is able to withstand temperatures of 350° F. for 72 hours without discoloring, peeling or otherwise deteriorating.

From the standpoint of the inner layer 26 of gettering material, barium is a common and satisfactory gettering agent, as are many other known materials. Since the tubes to be used for this purpose, such as the well-known 6V6 tubes, are commonly purchased on the market, they are used with such gettering materials as they may carry.

For best results the metal shell 12 is composed of the same type of metal as is used as a base for the painted articles with respect to which the paint strippers under investigation are likely to be used. Since many objects with respect to which hydrogen embrittlement is a serious problem are composed of steel, it is often satisfactory to employ commercially available 6V6 tubes since the shells of such tubes are made of steel. In other cases, however, it may be desirable to prepare special tubes in which the shells are composed of steel alloys, columbium alloys, titanium or other metal employed as strength members of mechanical structures. For purposes of illustration, the invention is described hereinafter as employing commercially available 6V6 tubes having steel shells. Such shells are sandblasted, machined or polished or otherwise treated in order to provide external surfaces which are similar to the external surfaces of steel objects with which the paint strippers investigated are likely to be used. Usually, in order to make tests representative of the actions of the strippers under the most adverse conditions, that is with steel objects whose surfaces have been made rough by sandblasting or otherwise, the external surface of the shell of the tube is sandblasted. Thereafter, a window is formed on the tube as described above; then the tube is painted either with or without preliminary plating. After the paint has been cured the tube is subjected to treatment to determine the hydrogen-effusion properties of a paint stripper under investigation.

In FIGS. 3 and 4, there is shown schematically an arrangement for measuring the hydrogen-effusion properties of a paint stripper. In this case, the end of the shell 12 of the probe 10 is located beneath the main level 40 of the liquid under investigation, while the insulating base 14 is located above that surface. An electric cable 42 into which the terminals 15 have been plugged connects the probe 10 with a measuring circuit 50. This circuit 50 includes a first meter $M_1$ for measuring a characteristic of the tube 10 that depends upon the amount of hydrogen that has flowed into the space within the envelope of the tube through the window 34, and a second meter $M_2$ that is used for standardizing the electron emission of the cathode.

By making measurements of the hydrogen-effusion properties of different paint strippers with different paints, information is thus obtained for determining the comparative hydrogen-effusion properties of such strippers. By use of this invention, paint strippers which have the lowest hydrogen-effusion-into-metal characteristics may be selected. As a result, any hydrogen embrittlement of metallic objects treated with paint strippers can be reduced or eliminated.

In accordance with this improvement a series of electronic vacuum tubes as above described, and preferably all having equal sensitivity to hydrogen permeation are all painted with a paint which is to be removed in commercial practice from plated or unplated steel parts. One set of these tubes will have been plated with plating material, for example, cadmium, with which the steel parts are originally plated before painting, and the plating on the tube is made substantially the same as on typical plated steel parts. The plating of the tube 10 may be accomplished before the hydrogen-impermeable coating 30 is applied. Thus, when the window 34 or 34' is provided, the exposed portion of the tube will be metal plated. Another set of tubes used in the series of tests will be unplated so that the corresponding windows 34 or 34' will be unplated. Then each of these tubes is individually partially submerged in the liquid paint remover in the manner above indicated so that the effect of different paint removers, from the standpoint of their different hydrogen-effusion characteristics may be measured. For each paint remover one of the unplated tubes will have been employed and one of the plated tubes will have been employed. Thus the hydrogen-effusion characteristics for each paint remover, are determined for use upon both plated and unplated steel parts.

In the above manner, the different hydrogen-effusion characteristics of different paint removers, and their relative values with respect to plated and unplated steel parts, may be ascertained. For best effects, the tests are all made at the same temperature. By using materials for the hydrogen-impermeable coating 30 of the tubes, which materials have been cured at higher temperatures and for longer times than the paints to be tested, the hydrogen-impermeable coating 30 will not be disturbed in testing operations. This applies where one type of epoxy resin, for example, is used for the hydrogen-impervious coating 30 on the tubes, and other epoxy resin paints are being removed as the paints on the articles being cleaned.

The plating of those tubes, which are commonly cadmium plated (but might be plated with other plating metal as may be required) is performed in a manner quite similar to that in which those steel articles which were plated had been initially plated. This particular plating method is described hereinafter.

A measuring circuit of the type that may be employed for measuring the pressure of the hydrogen atmosphere formed within the envelope 11 of the tube of this invention is shown in FIG. 4. As indicated there, the cathode 16 is connected to one end of a potentiometer 51, the other end of which is connected to the negative terminal of a power supply PS. The inner grid 18 is connected to a slide wire 52 of the potentiometer. The outer grid 20 is connected through a meter $M_2$ to the positive terminal of the power supply PS, and the plate 22 is connected through a micro-microammeter $M_1$ to the negative terminal of the power supply PS. The voltage supplied by the power supply PS is of such a magnitude that electrons accelerated from the cathode 16 toward the grid 20 attain energies corresponding to those above the ionization potential of molecular hydrogen. In use the shell 12 is connected to one end of the filament 24 and is grounded.

The outer screen 20 is employed as an accelerator electrode. The plate 22 is employed as a positive charge collector, or positive ion collector. The inner grid 18 is employed for regulating the electron current formed within the tube under standard conditions. By manipulating the slider 52 on the potentiometer 51, the current flowing through the tube at any time may be standardized, thus compensating for differences in the electron emissive properties of cathodes 16 of different tubes, or for compensating for differences in the electron emissive properties of the cathode of any tube during the life of the tube. The effectiveness of the inner grid for this purpose arises from the fact that the 6V6 tube has a gradual, or remote, cut-off characteristic as distinguished from a sharp cut-off characteristic thus permitting a gradual change of current to be produced when the bias on the inner grid 18 relative to the cathode 16 is changed. The bias on the emission control grid may also be adjusted when the probe is in use in order to adjust its sensitivity. Over a wide range of operation the ion current indicated by meter $M_1$ is proportional to the emission current indicated by meter $M_2$.

In operation, hydrogen effusing from the paint and paint stripper during the stripping action diffuses through the window 34 of the tube 10 to the inner surface thereof. At the inner surface the hydrogen is desorbed thus increasing the pressure of hydrogen gas existing within the envelope 11. As mentioned above, the hydrogen may flow through the wall in the form of a positive ion current, combining somehow with electrons on the inner surface of the envelope, thereby forming atomic hydrogen. Such atoms of hydrogen then combine within the envelope, probably at the surface, to form molecular hydrogen which thereby establishes a molecular hydrogen atmosphere within the envelope. Regardless of the explanation of the phenomena involved, the fact is that the pressure of hydrogen gas within the envelope is increased when the tube is immersed in a liquid which is capable of causing such diffusion of hydrogen into the envelope. By locating the window at a distance from the gettering material, direct absorption of hydrogen by gettering material as the hydrogen diffuses through the shell is avoided. Instead, the hydrogen is desorbed rapidly from the portion of the wall free of gettering material, thus maximizing the rate of flow of hydrogen into the space within the probe envelope.

In the process of accelerating electrons from the cathode 16 toward the accelerator grid 20, electrons travel at a high speed through the space between the cathode 16 and the accelerator grid 20. Thereafter, they are decelerated in the space between the accelerator grid 20 and the collector plate 22. Electrons bombard hydrogen in the space between the accelerator grid 20 and the plate 22 thereby ionizing the hydrogen gas. As a result, electrons represented by the symbol $e^-$ and the hydrogen ions represented by the symbols $H^+$ and $H_2^+$ and $H_3^+$ are formed in the space within the envelope between the accelerator grid 20 and the collector plate 22. Such hydrogen ions, being positively charged, are repelled by the accelerator grid 20 toward the collector plate 22. When they strike the collector plate, they collect their missing electrons which flow through the micro-microammeter $M_1$. At the same time, electrons formed in the ionization process are drawn toward the accelerator grid 20. These electrons flow to the positive terminal of the power supply. Hydrogen ions and electrons are also formed in the space between the two grids by virtue of the bombardment of hydrogen gas in this region by the accelerated electrons. These hydrogen ions flow to the inner grid 18, where they are discharged, and these electrons flow to the outer grid 20. The latter hydrogen ions and electrons do not contribute to the current flowing through the micro-microammeter $M_1$.

In practice therefore the magnitude of the current flowing through the meter $M_1$ is a measure of the pressure of hydrogen gas present within the envelope 11 at any time. In practice, it is observed that when a probe 10 exposed to fluid is first turned on, the magnitude of the current flowing through the meter $M_1$ changes as a function of time. For this reason, measurements are made after the current has become stabilized, or else has fallen below some predetermined value. Then the probe is immersed in the fluid under test and that rate at which the ion current increases is measured while the probe is exposed to the fluid.

In normal usage, when a probe is first energized the ion current rises rapidly to a high peak value which may exceed $10^{-7}$ amp. This current arises from the fact that the initial heating of the probe, especially the initial heating of the cathode, causes some of the gases that have previously been adsorbed on various electrodes and the internal surface of the shell to be desorbed. While the probe remains warm these gases are adsorbed by the gettering material, if any, gradually reducing the ion current to a value of $4 \times 10^{-9}$ amp. or less. The time required for the ion current to reach such a sufficiently low value to permit subsequent significant measurements to be made varies between 10 to 30 minutes, if the tube has once been previously properly prepared.

The 6V6 or other tubes to be used are cleaned, and are plated, if plated porous cadmium is to be applied, substantially in accordance with the following procedures in which Steps 1–3 refer to the initial preparation of the tube surface, Step 4 refers to the forming of a hydrogen-permeable window, Steps 5–14 refer to the calibration of the probe, Steps 15 and 16 refer to plating and cleaning of the probe, and Steps 17 and 18 refer to the testing of strippers with prepared tubes:

*Step 1.*—Paint that may have been applied in the original manufacturing of the tube, nickel plating, if any, originally applied to the tube, and any oxide scale that has accumulated, are removed from the outer surface of the tube shell. This is best done by sandblasting, such as with 200 mesh grit or 100 mesh grit. The coarser grit produces a rougher surface thus yielding a more porous plate.

*Step 2.*—Exterior nickel plating originally appearing on the surface of the shell is subjected to an electropolishing operation with sulphuric acid-glycerol solution followed by distilled water rinsing, which is then followed by acetone rinsing or spraying. In these operations, the tube base 14 and the joint between the base and the metal shell 12, are supported above the level of the solutions.

*Step 3.*—If the electro-polishing operation of Step 2 is employed, the tube shell is again sandblasted in order to provide a roughened surface. This is important so that the subsequent cadmium plating will be porous as is often the case with plated steel objects. Such porous plating is important because the various treatments of the cadmium plated steel articles from which paint is eventually to be stripped, often cause hydrogen to be sorbed to a degree ordinarily sufficient to result in dangerous hydrogen embrittlement. To reduce danger from such embrittlement hydrogen is subsequently removed by baking for a period varying from three hours to as much as 23 hours according to the steel treated. If a smooth electropolished surface of such an article were plated, expulsion of absorbed hydrogen to an adequate degree would be impossible or uneconomical, since hydrogen does not diffuse readily through a dense, that is, imporous, cadmium plate. Therefore, the outer surfaces of articles are often sandblasted in order to facilitate economical hydrogen desorption of such articles by heating in order to reduce their hydrogen content. Accordingly, in order to produce a tube which has hydrogen absorption properties of such object, the tube wall 12 is usually sandblasted to simulate the surface characteristics of the steel articles subsequently to be treated. The sandblasted tube is quickly washed in distilled water and preferably dried with acetone.

*Step 4.*—Using a chemical masking tape in combination with an epoxy paint for the end of the tube, a window is prepared thusly. The top ½ inch of the tube is masked and the lower ¾ inch of the top metal shell is masked leaving a window ¾ inch high circumferentially around the tube.

*Step 5.*—The tube is connected to the measuring circuit 50 and the electron emission current adjusted to 5 milliamperes as measured with the meter $M_2$.

*Step 6.*—The tube shell is made anodic and the tube is immersed in a magnesium sulphate-sulphuric acid pickle bath 60. The pickling current is set at 2 amps. Anodic pickling is continued for 50 seconds. To make the shell anodic the shell is connected to the plus terminal of a battery B and the negative terminal is connected through an ammeter $M_3$ to a cathode 62 submerged in the pickling bath 60 as illustrated in FIG. 5.

*Step 7.*—The tube is then removed from the pickling bath and is rapidly sprayed with warm water to remove traces of acid.

*Step 8.*—The tube is then dipped into hot (150° F.) water. Steps 7 and 8 should take 10 seconds total together. The tube ion current normally should read approximately $10 \times 10^{-9}$ amps. following Step 8.

*Step 9.*—The tube is then removed from the hot water and placed in a calibrating solution of sodium hydroxide at 70° F. The concentration of the sodium solution is 15 grams of sodium hydroxide per liter of solution. This solution has a predetermined hydrogen effusion rate.

*Step 10.*—When the ion current has decreased to $4 \times 10^{-9}$ amps., the tube shell is made cathodic with a current density of 0.8 amp. with respect to a graphite or gold anode. The time necessary for the ion current to again reach $10 \times 10^{-9}$ amps. while this cathode current is applied is determined. At this time, the charging current is turned off and the time required for the ion current to again reach $4 \times 10^{-9}$ amps. is measured. Typical times are about 2 minutes and about 20 minutes, respectively.

*Step 11.*—The tube is then removed from the bath and is again spray-rinsed with warm water, followed by an acetone spray.

*Step 12.*—If the hydrogen permeation rate observed, as measured by the time required for the ion current to change from $4 \times 10^{-9}$ amps. to be $10 \times 10^{-9}$ amps. in Step 10, is 10% too great the window area is decreased by 10% and conversely, if it were too little, the window area is increased proportionately. The area of a window is adjusted by painting the edges of the window or by removing paint from the edges as previously described.

Steps 10 and 11 are then repeated if necessary. The measurement obtained in the last performance of Step 10 represents the calibration of the probe.

*Step 13.*—After the calibration has been satisfactorily achieved, the probe is rinsed in distilled water and is then sprayed with acetone in order to remove residual water. By removing residual water from the tube after it has been thus calibrated, the danger of rusting or corrosion of the tube prior to its subsequent use in measuring a fluid under test is greatly reduced.

In carrying out the foregoing steps, it is to be noted that certain of the steps, especially Step 6 and those associated therewith, are employed for cleaning the external surface of the tube shell. Other steps, especially Step 10 and those associated therewith, relate to the calibration of the tube. The best solution to employ for cleaning the external surface is a strong acid. However, the best solution to employ for calibration is a weak acid, a neutral solution or an alkaline solution. Potassium hydroxide may be employed in place of sodium hydroxide as a calibrating solution. Even water of known purity may be employed for calibration. In any event, however, strong acids are avoided during the calibration step because of the fact that they react rapidly with the outer surface of the tube. The anodic pickling cleaning process employed above is also known as an electrochemical cleaning process. By employing an anodic electrochemical cleaning process, permeation of the probe by hydrogen is avoided during cleaning.

It will be noted that the tube shell can be made either cathodic or anodic with respect to the graphite or gold polarizing electrode by manipulation of the reversing switch SW of FIG. 5. It will also be noted that the current flowing to or from the tube shell can be regulated by adjustment of the rheostat R which is connected between the switch SW and the polarizing electrode 62. It will be understood, of course, that this electrode acts as an anode when the tube shell acts as a cathode and acts as a cathode when the tube shell acts as an anode.

*Step 14.*—The tube having been cleaned and calibrated as above, it is then sandblasted. Thereafter it is connected to the measuring circuit 50 and allowed to warm up in air until the ion current, as read on a micro-microammeter $M_1$ becomes stabilized, i.e., until no more than a 5% change in ion current is observed in five minutes time. The electron-emission current within the tube will previously have been adjusted to five milliamperes.

*Step 15.*—The tube, when to be plated, is then immersed, sufficiently to cover the window 34, for three minutes in the low embrittlement cadmium plating solution 65 (FIG. 6) next described at a predetermined temperature, such as 25° C., which temperature is maintained approximately constant throughout the plating operation. Since the solution cools the tube shell, a decrease in ion current (10% or less) is observed. A cadmium anode 66 is disposed adjacent the tube at a distance preferably of 3/4 inch, which anode in the case of the circular window is a peripherally arranged anode such as a solid cylinder of cadmium metal surrounding the tube equidistantly. The short distance of 3/4 inch or 1/2 inch to 1 inch, permits adequate fast plating with low voltage as described below. The mentioned plating solution includes sodium cyanide approximating 146 lbs. per hundred gallons of water and 47 lbs. of cadmium oxide. The oxide is dissolved in a portion of the cyanide solution which is then added to the remaining cyanide solution which is placed in the plating tank employed. The first time the solution is made up the cadmium anode 66 remains in the solution from between about 8 to about 16 hours before use. The tube shell 12 then is made cathodic with respect to the cadmium anode and the plating current applied. According to the method presently deemed best, a current density of 40 amperes per square foot of shell surface is used, and plating conducted for 7.6 minutes (minimum) to yield the commonly desired thickness of 0.0005 inch of plating 68. Since the window surface of the tubes employed has been set at a standard of 12.5 square centimeters, the current used is 0.54 ampere. For best results, the voltage applied is less than about one volt, and current operations employ 0.20 volt. This low voltage is used to maintain a low hydrogen effusion rate. A control or makeup solution is used that contains 6.5 to 8.0 oz. per gallon of cadmium in the form of 8.0 oz. per gallon (maximum) of sodium carbonate, 3.5 to 5.0 oz. per gallon of sodium hydroxide and 9 to 15 oz. per gallon of free sodium cyanide. As the plating solution agents ingredients are added to maintain the composition within the ranges specified. If the sulfide content exceeds 1 part per million by weight, the solution is replaced.

*Step 16.*—The plated tube is removed from the plating bath, rinsed with distilled water, and dried. Where desirable to remove residual water, it is then sprayed with acetone. The tube is then heated for over about 30 minutes at a temperature of about 190° C. to drive hydrogen out of the tube wall and to absorb in the gettering material hydrogen that is within the tube.

Tube probes having been prepared as above, they are used in testing paint strippers for various paints. For this purpose the steel tubes with bare windows, and the steel tubes with plated windows, as above described, are thoroughly dried, coated with paint and used in tests as follows:

*Step 17.*—With the tube current turned off from the chosen tube, the paint to be tested with respect to any stripper, is coated over its window. Such coating is conveniently done by applying the coating over the entire outer surface of the probe by dipping it into the paint or by spraying to produce more uniform coverage. The paint is then air-dried and set for an appropriate time. For example, an epoxy resin paint was cured for 24 hours by air drying at 80° F.

*Step 18.*—The respective paint having been properly set on a given tube probe, the respective probe is plugged into its socket S, as seen in FIG. 3, where it is energized and permitted to age until the collector current falls below $4 \times 10^{-9}$ amps. At this time, the probe is immersed in the stripper solution or bath as indicated in FIG. 3, which stripper bath is maintained at a constant temperature, such as 22° C. (72° F.), or 45° C. (113° F.). Whatever the temperature of the bath it is important that it be maintained constant during the test. On each test, the "effusion constant" (minutes to reach $1 \times 10^{-7}$ amps.) is noted and also the time for adequately stripping the paint (as hereinafter explained) is noted. From these figures the total amount of effective hydrogen that effuses into the tube during the time required for removing the particular paint with each stripper may be computed. The best stripper for a particular paint is the one that produces the smallest total amount of effective hydrogen.

In the case of a series of comparative tests made with tube probes whose windows were not plated, the following determinations were made with respect to four stripping solutions used upon a given epoxy resin paint. With this particular paint, each tube is coated with the paint by dipping and then hardened by air-drying at 80° F. for 24 hours. Each tube probe was then plugged into the socket S, energized and permitted to age, as above indicated, until the collector current fell below $4 \times 10^{-9}$ amps. At this time the probe is immersed into the respective stripper being tested, as indicated in FIG. 3, and the stripper is maintained at a constant temperature of 22° C. (72° F.). Representative results obtained with four different commercial strippers, designated in the following Table I by the letters A, B, C and D, follow:

*Table I*

| Stripper | Effusion Constant (Minutes to reach $10^{-7}$ amp.) | Stripping Time | Total Effective Hydrogen |
|---|---|---|---|
| A | 15 minutes | 15 minutes | 1 |
| B | 40 hours | 2 hours | 1/20 |
| C | ∞ | 20 minutes | 0 |
| D | 1 minute | 30 minutes | 30 |

In the first column, the different strippers are identified. In the second column, the effusion constants measured as described above, are tabulated. Note that in this case the current with commercial stripper C never did attain a value of $10^{-7}$ amp. over the period of measurement, which was many hours.

In the third column, the time required for the stripper to be effective in stripping the paint from the tube, was measured. This determination was made by visual observation of the window. In the fourth column, the comparative amounts of hydrogen that permeated the probe during the time required for the stripper to strip the entire coating from the probe window, had been computed. This computation has been made by dividing the stripping time by the effusion constant.

In practice, the total amount of hydrogen differs somewhat from the values thus calculated because of the getter action. Nevertheless, these values do represent a figure of merit for each of the strippers which can therefor be employed in selecting a stripper for the particular paint in question. Note that in the particular examples given, commercial stripper C is excellent for the purpose; commercial stripper B is very good, but that commercial strippers A and D are not very satisfactory. As a practical matter, it is found that considerable hydrogen embrittlement can be caused by the use of commercial strippers A and D but that by using commercial strippers B and C, hydrogen embrittlement can be largely avoided.

In some cases, the entire metal tube is cadmium plated, without first coating the tube with the window defining coating material, and then the hydrogen impermeable resin or other coating 30 is applied to form the respective window 34 or 34' as previously indicated. It is also to be observed that, as a general practice, the metal shell of each tube will be of uniform or homogeneous composition.

From the standpoint of anode sizes, arrangements, and shapes, the cadmium anode previously described as being a solid cadmium cylinder (see FIG. 6), may be replaced by a group of rod anodes, each a half inch in diameter, and equidistantly arranged around a circle where the window 34' in the form of a cylinder is used. These rod anodes similarly may be 8 inches long and disposed in the solution to a depth of about 6 inches, as is done for the described solid cylinder anode. As previously indicated, the cadmium thickness for plating the tubes would be the typical thickness of 0.0005 inch which is also commonly used on the steel articles from which paint is to be stripped. Plating times will be 7.6 minutes or more as mentioned in the examples above.

Where reference is made to a visual operation of the paint stripping procedure, it is to be appreciated that different paint strippers produce somewhat different effects. For example, one type of paint stripper appears to work under a layer of paint, loosening it so that the paint layer lifts off of the metal surface. With another class of paint strippers, such strippers cause the paint to loosen and wrinkle or buckle in such a manner that the paint may be easily brushed off or rinsed off. With a third type of paint strippers, such as those dissolving zinc chromate primers, the paint appears largely to be dissolved rather than merely loosened or caused to lift from the metal surface. The results are well understood and the effects are easily observed.

The chart of Table II is supplied to indicate how various strippers function with respect to their hydrogen effusion and hydrogen permeation rates when used with different painting materials and on unpainted tubes.

ping material without removing the coating that forms the window. The coating designated by the symbol Y consisted of a primer identical with the coating X just described and then an epoxy top coat employing a different commercial accelerator. The coating designated by the symbol Z was a commercial thio-urea-containing top coat painted over a zinc chromate primer.

All of the tests represented in Table II were made with a tube having a window area of 12.5 square centimeters. In some cases the tests were made with unplated tubes, in others with plated tubes as indicated. All of these tests were made with the temperature of the stripper at 22° C. In all cases the collector current was reduced to a point below $4 \times 10^{-9}$ amp. before making a test. In the cases where tests were made without any paint being first applied to the tube, the times indicated represent the times elapsed before the current measurement indicated was produced. In the case of the painted tubes the stripping time is indicated and also the current measured by the micro-microammeter $M_1$ at the end of that time. Thus, for example, with the unpainted bare tube immersed in stripper E a current of $1 \times 10^{-6}$ amp. was reached in five minutes. In the case of stripper L, a current of only $1 \times 10^{-8}$ amp. was reached in 45 minutes. From these measurements approximate values of total effective hydrogen permeating the tube during the total time required for stripping can be determined by a method similar to that described in connection with Table I.

In the righthand column of Table II the maximum values of the total effective hydrogen S as determined from these tests for the respective strippers have been tabulated. These maximum values represent the highest values as determined with any of the paints with respect to which the specific stripper was tested, as indicated in Table II. Thus, for example, for stripper H the maximum value S is the value for coating Y. Examination of Table II shows that stripper P produced the least total effective hydrogen. Strippers G and J produced more hydrogen Table II

| No. | Paint W | | Paint X | | Paint Y | | Paint Z | | S |
|---|---|---|---|---|---|---|---|---|---|
| | Bare | Cd | Bare | Cd | Bare | Cd | Bare | Cd | |
| E | $1 \times 10^{-6}$ 5 min. | | | | | | | | 10 |
| F | 0 | $1 \times 10^{-7}$ 10 min. | | | | | | | 1 |
| G | 0 | 0 | 0 | $5 \times 10^{-9}$ 15 min. | | | | | 0.01 |
| H | 0 | 0 | 0 | 0 | $7 \times 10^{-9}$ 45 min. | 0 | 0 | $1 \times 10^{-7}$ 30 min. | 0 | $9 \times 10^{-9}$ 30 min. | 1 |
| J | 0 | 0 | 0 | 0 | 0 | $5 \times 10^{-9}$ 45 min. | 0 | 0 | 0 | 0 | 0.01 |
| K | 0 | | 0 | | 0 | | $1 \times 10^{-6}$ 15 min. | | | | 10 |
| L | 0 | $1 \times 10^{-8}$ 45 min. | 0 | 0 | 0 | 0 | 0 | $5 \times 10^{-7}$ 2 hrs. | 0 | $1 \times 10^{-8}$ 30 min. | 5 |
| M | 0 | 0 | 0 | 0 | 0 | 0 | 0 | 0 | $6 \times 10^{-9}$ 15 min. | | 0.02 |
| N | 0 | 0 | | | | | | | $1 \times 10^{-6}$ 30 min. | | 10 |
| P | 0 | 0 | 0 | 0 | 0 | 0 | 0 | 0 | 0 | 0 | 0 |

In Table II, the coating material designated by the symbol W was a commercial zinc chromate primer; the coating designated by the symbol X was a primer consisting of the epoxy resin paint previously described hereinabove. This primer was air dried for 24 hours at a temperature of 80° F. It is to be noted in this connection that this coating was not as hard as the coating 30 employed for forming the window and could be removed by the stripping material without removing the coating that forms the window.

and stripper K produced the most hydrogen. It is to be noted that strippers E and F produced so much hydrogen even in the absence of paint, that they were not tested with paint.

In determining the values of S it is to be noted that no account has been taken of the fact that some of the hydrogen entering the tube is absorbed by the gettering material. In practice it is found that the rate of gettering is about 10% of the hydrogen per second in a typical 6V6 tube. Accordingly, in comparing the values of total effective hydrogen calculated in this manner, account should be taken of the time at which the current measurement was made.

Figure 7:
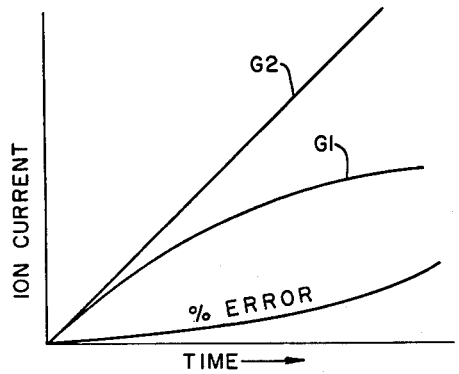
FIG. 7 is a graph employed in the explanation of the operation of different types of hydrogen detection probes.

In a typical case illustrated in FIG. 7, graph $G_1$ indicates how the ion current or hydrogen pressure with the tube varies as a function of time during a paint-stripping operation when employing a probe having gettering material deposited on its walls. Graph $G_2$ shows how the ion current or hydrogen pressure of the probe varies as a function of time in a getterless tube. The error in estimating the total effective hydrogen when gettering material is employed increases with time. This is indicated in the graph by the error curve $G_3$. Taking into account the differences in time and the approximate total effective hydrogen S, the order of preference for the strippers listed in Table II is: P, G, J, M, H, L, K, N, F, E.

In other words, for example, of the strippers tested, stripper P is most effective in avoiding hydrogen permeation. Stripper G is more effective than stripper J because they both produce the same current at the end of the stripping interval but the stripping interval for stripper G is less than the stripping interval for stripper J. Similarly stripper K is more effective than stripper N. It is to be noted that no measurements were made with strippers E and F with painted tubes. In this case these strippers were considered to be so poor when tested with unpainted tubes that they were not considered satisfactory to employ with painted objectives.

Figure 8:
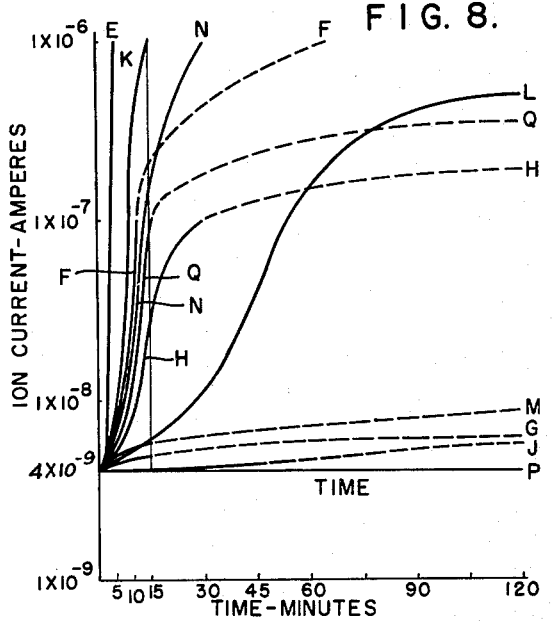
FIG. 8 is a series of graphs employed in explaining the operation of a hydrogen detector probe under different circumstances.

In FIG. 8, a series of graphs are shown which represent the manner in which the ion current varies as a function of time with a tube employing gettering material for the different strippers listed in Table II. In all cases the graph for each stripper corresponds to the worst measurement obtained with the respective strippers. In each case the solid-line portion of the graph indicates how the ion current varies as a function of time during the stripping interval. The dashed portions of the graphs indicate how the current would continue to increase if the tube remained exposed to the stripper after stripping had been completed. Whether this hydrogen is generated by the stripper or by the paint dissolved in it, or by the reaction between the stripper and the shell is undetermined at the present time. For example, with stripper G it is to be noted that the increase in ion current occurring during the stripping interval of 15 minutes, is $10^{-9}$. The actual total hydrogen would be somewhat larger than this amount as indicated by the difference between graphs $G_2$ and $G_1$ of FIG. 7. In any event, it is to be noted that stripper G caused very little hydrogen to enter the tube during the stripping interval.

Inasmuch as hydrogen continues to enter the probe, in some cases, after the stripping operation has been completed the stripper is removed promptly upon completion of the stripping operation. The probe is washed with hot water and scrubbed at this time. In a similar way, when paint is being stripped from a painted object, the stripper is removed and the object cleaned promptly upon completion of the stripping operation.

The graph designated by the letter Q shows how the hydrogen ion current varies as a function of time when an unplated sandblasted probe was immersed in a $\frac{1}{10}$ of 1% solution of sulphuric acid at 25° C. Such a solution has a pH of about 5. In this case, it is to be noted that the current attained a value of $1 \times 10^{-7}$ amp. at the end of 15 minutes. It was determined independently that the exposure of a high strength steel notched tensile specimen having an equivalent amount of hydrogen, had sufficiently low hydrogen content to permit its being considered relatively free of hydrogen embrittlement effects. This test was made in a standard manner in which an elongated notched tensile bar of standard size and shape was subjected to a load equal to 75% of its ultimate nominal tensile strength. Taking this fact into account, it is to be noted that stripper E, F, L, H, K, and N are unsafe to use, whereas strippers G, J, M, and P are safe to use. Such a method of determining hydrogen embrittlement safety is described for example in articles by Dr. Cloyd A. Snavely and B. Cohen in the 1960 edition of the Annual Technical Proceedings of the American Electro-Platers Society.

Figure 9:
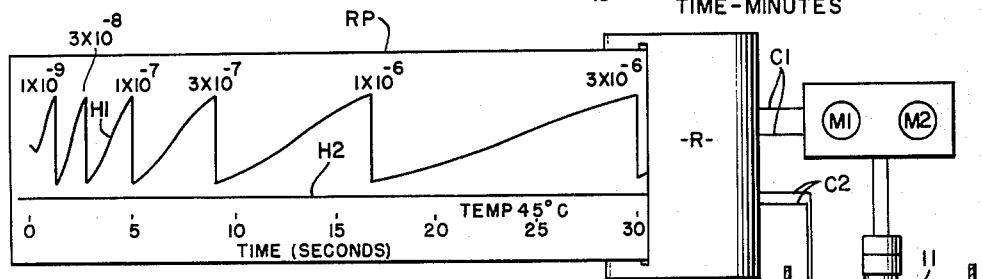
FIG. 9 is a schematic diagram of a recording system employed in the practice of the invention.

In FIG. 9 there is illustrated an arrangement for simultaneously recording the ion current and the temperature of the stripping bath. In this case the current flowing through the meter $M_1$ also flows through conductors $C_1$ to one input of 2-trace recorder R. In addition, a thermocouple TH submerged in the bath is connected by means of a pair of conductors $C_2$ to another input of the recorder. A suitable recorder to employ is a type 542 Dynograph Recorder manufactured by Offner Electronics, Inc., Schiller Park, Illinois. In this particular case the micro-microammeter employed was a model 414 manufactured by Keithley Instruments, Inc., Cleveland, Ohio. This particular micro-microammeter employs a sensitivity control that can be adjusted manually by manipulation of a multi-position switch, or knob. With the combination of the multiple sensitivity micro-microammeter $M_1$ and the recorder R, a graph $H_2$ is drawn automatically during a test showing how the temperature of the bath varies as a function of time. A graph $H_1$ is represented which shows how the hydrogen ion current in the probe 11 varies as a function of time. Time in minutes elapsed since commencement of recording is indicated at the lower edge of the recording paper RP. With this particular arrangement the knob that controls the meter $M_1$ is manually switched to change its sensitivity whenever the recording pen reaches the upper edge of the recording paper RP. The figures written at the upper edges of the sawtooth wave graph $H_1$ indicate the sensitivity of the meter during the recording of the next previous portion of the graph. For example, in graph $H_1$ at a time 15 minutes after commencement of recording, the ion current was $0.8 \times 10^{-6}$. At the lower portion of the recording paper RP the temperature of the bath as detected by the thermocouple TH is displayed as a function of time in graph $H_2$.

In some cases it is desirable to employ a thermocouple that is in direct contact with the shell of the probe. Special probes suitable for this purpose may be provided. In many cases the temperature of the bath deviates by any substantial amount from the reference temperature at which the characteristics of other strippers have been measured. It is well-known that the rate of hydrogen permeation doubles for each 14.4° C. rise in temperature. Though a 50% error in measurement may not be significant under some circumstances, as is obvious from a comparison of the characteristics of strippers G and K, for precise comparisons where the strippers are of more nearly the same characteristic as with strippers G and M, compensation is made for temperature differences at which the measurements have been made.

The need for making corrections because of the sorption characteristics of gettering material may be eliminated by employing either a getterless tube or a tube in which the gettering action of a gettering element occurs only when that gettering element is heated. With a tube of either of the latter two types, the ion current increases more nearly as a linear function of time as indicated by graph $G_2$ of FIG. 7.

The previously mentioned low voltage employed during plating, that is less than about one volt, or for example, 0.20 volt, is used for determining the hydrogen-effusion properties of the plating solution since it has been discovered that low voltage results in low hydrogen input or permeation. Thus, hydrogen permeation (which is a measure of potential hydrogen embrittlement of a steel part being treated) may be reduced by as much as a factor of 1000 by employing a plating voltage to a low value, such as 0.20 volt, compared with the conventional 4 to 9 volts without sacrifice of deposition rate. At the same time the plating rate may be maintained by employing an anode surface that is large compared with the cathode surface, such as 6:1. In other words, the surface of the anodes 66 or 66a is about 6 times the area of the part of the surface of the shell 12 that is to be plated. The current density is maintained constant, as heretofore indicated. These factors relate not only to the plating of the testing probes here used, but also to the plating initially of steel parts here described as parts which are to be painted and which are to be stripped by strippers chosen in accordance with this invention. In this respect, it has been found that the hydrogen permeation or effusion rate can be doubled by increasing the plating voltage from 0.20 volt to 0.24 volt.

The cadmium plated porous tube of this invention may be employed not only for measuring the hydrogen generating properties of strippers but also for other purposes. For example, they may be employed to measure the free amine concentration of various compositions. By way of example, they may be employed to measure the free amine concentration of the tertiary amine adduct previously described herein employed as an accelerator of the epoxy paint. Such tertiary amine adduct is normally suspended in a toluene-benzene solvent. To measure the free amine concentration of such a paint accelerator, a measured amount of the accelerator is mixed with an excess of methylene chloride. The amount of methylene chloride added exceeds that required to react with all of the free amine present. The reaction produced by the addition of the methylene chloride is of the form $NH_2+Cl^- \rightarrow HCl+NH^-$. The hydrochloric acid developed attaches itself to epoxy chains that are present. However, this hydrochloric acid dissociates freely, thus $HCl \rightarrow H^+ + Cl^-$. In the presence of the hydrochloric acid a galvanic action is set up between the iron in the shell and the cadmium plate thereon in which the iron is the cathode and the cadmium is the anode. Under these conditions hydrogen ions are deposited on the iron thereby flowing through the shell into the tube. In a similar way, the free amine content of blood may be measured.

A cadmium plated porous tube may also be employed to measure the concentration of a compound in an aqueous solution, at least where the compound is a salt that dissociates to make the solution conductive. In this case the galvanic action established between the iron shell and the porous cadmium plate generates local currents which cause hydrogen ions to permeate the shell in proportion to the conductivity of the solution. The hydrogen permeation rate is substantially proportional to the conductivity and hence substantially proportional to the concentration of the salt in the solution. Even an unplated porous tube may be employed for this purpose. In order to measure the conductivity of a solution with an unplated tube, a cadmium anode located at a distance from the tube is connected by means of a wire to the shell, thus causing a current to be generated which drives hydrogen into the tube.

In order to measure the conductivity of a solution, it is not necessary that the material plated on the shell be cadmium nor even that the shell be steel. However, for best effects the plating material should be positive relative to the shell material in the elecromotive series. For example, zinc plated on a steel shell can be used for measuring the conductivity of a solution. Likewise, another example of a tube suitable for this purpose would be one in which the wall is composed of palladium and in which platinum has been plated on the palladium. In all cases best effects are obtained by roughening the surface of the shell such as by sandblasting.

The tubes of this invention may also be employed to measure the pH of either acidic or basic solutions. For instance, a tube with a cadmium plated steel shell may be used. An unplated tube may also be readily employed to measure the pH of an acid solution. In any of these cases, the rate of hydrogen permeation increases with the ion concentration of the solution.

The method of this invention may also be used to measure the porosity of a plate deposited on a metal object. To make such a measurement the surface of a tube is first prepared in the same manner as the work tube and then the tube is plated in the same manner as the work. Tubes so prepared with different surface preparation and plating processes are immersed in a standard solution of ammonium hydroxide such as an 0.1 N solution and the hydrogen effusion rate measured for each tube. This measurement is most simply made by determining the time required for the current to rise from $4 \times 10^{-9}$ amp. to $10^{-7}$ amp. Measurements obtained this way provide a comparison of the porosity of plates formed by different processes.

Though this invention has been described herein only with reference to particular embodiments and applications thereof, it will be understood that it may be embodied in many other forms and applied in many other ways within the scope of the appended claims.

The invention claimed is:

1. In a method of measuring the hydrogen-effusion properties of a paint removing liquid by means of a vacuum tube having a hydrogen-permeable envelope formed by a shell member of uniform composition over its area, and having electrode elements within the shell electrically connected to various prongs, the steps of:
   covering a portion of the external surface of said envelope with a paint under investigation;
   energizing the electrode elements of said vacuum tube to cause an ion current to flow to one of said electrodes in accordance with the pressure of gas within said envelope;
   covering the painted part of said shell with said paint removing liquid, thereby causing hydrogen effusing from said liquid to permeate said envelope, whereby an ion current flowing to one electrode changes in accordance with the increase in pressure of hydrogen gas developed within said envelope as a result of such permeation; and
   measuring the rate at which said ion current changes while the painted part of said shell is covered with said paint removing liquid.

2. A method as defined in claim 1 that comprises measuring the time required for such liquid to remove said paint whereby the total amount of hydrogen that effuses during such time interval can be determined.

3. A method as defined in claim 1 in which the paint removing liquid applied to said painted portion is a paint stripper.

4. A method as defined in claim 1 including the step of applying a metal plating to said portion of said envelope surface prior to painting the same, and conducting said plating with a current density to yield a porous plating.

5. A method as defined in claim 4 including sanding said portion of said external surface to roughen the same prior to plating and insure porosity of said plating.

6. A method as defined in claim 1 wherein said plating is conducted with a voltage less than about one volt.

7. A method as defined in claim 1 including the steps of:
   cleaning the external surface of said tube shell to remove foreign deposits; and
   treating said surface to render it rough;
   plating the portion of the tube so roughened thereby forming a porous exposed wall portion that is uniformly roughened and then applying the paint under investigation to said porous plated portion.

8. The method of measuring the hydrogen-effusion properties of a paint removing liquid by means of a vacuum tube having a hydrogen-permeable envelope formed by a shell member of uniform composition over its area, and a base member with external electrical terminal prongs at one end thereof, which shell member is immersible in a fluid and has electrode elements within the shell electrically connected to various prongs, including the steps of:

covering a portion of the external surface of said envelope with a paint under investigation;

energizing the electrode elements of said vacuum tube to cause an ion current to flow to one of said electrodes in accordance with the pressure of gas within said envelope;

immersing the painted part of said shell in said paint removing liquid, thereby causing hydrogen effusing from said liquid to permeate said envelope, whereby ion current flowing to said one electrode in accordance with the increase in pressure of hydrogen gas developed within said envelope as a result of such permeation is changed;

simultaneously blocking the flow of hydrogen into said envelope except through the painted portion of said shell; and measuring the rate at which said ion current changes while the painted part of said shell is covered with said paint removing liquid.

9. A method for determining the acceptability of paint removing solutions for the treatment of painted plated steel objects subject to hydrogen embrittlement, including the following steps:

coating the wall of a metal wall vacuum tube, which wall is hydrogen permeable, the coating being a hydrogen-impermeable coating layer, and providing a window area of said wall which remains uncoated by said hydrogen-impermeable coating material;

applying a metal plating to said window, said plating metal corresponding with the plating metal of a plated steel object from which paint is to be stripped;

painting said plated window with a paint corresponding with a paint to be used for the metal object which has been plated and painted as indicated, and causing said applied paint on said window to set;

immersing said vacuum tube having said metal plated window with said paint thereover into the paint stripping solution being tested;

energizing the electrode elements of said vacuum tube to cause an ion current to flow to one of said electrodes in accordance with the pressure of gas within said tube wall, whereby an ion current flowing to one electrode changes in accordance with the increase in pressure of hydrogen gas developed within said tube wall as a result of hydrogen permeation through said plated window; and measuring the rate at which said ion current changes while the painted part of said wall is covered with said paint removing liquid.

10. A method as defined in claim 9 which includes measuring the time required for such paint removing liquid to remove said paint whereby the total amount of hydrogen that effuses during the interval of paint removal may be determined.

11. A method as defined in claim 9 wherein said metal plating operation is conducted with an applied voltage less than about one volt.

12. A method as defined in claim 11 wherein the voltage used in plating is in the order of about 0.2 volt.

13. A method as defined in claim 11 wherein the current employed is about 40 amperes per square foot.

14. A method as defined in claim 9 including the step of sanding the tube wall portion to be plated to roughen the surface thereof and the subsequently applied plating thereby is rendered porous.

15. An electronic probe for testing hydrogen-permeation characteristics of liquids, including:

a vacuum tube having electrode elements enclosed in a hydrogen-permeable metal shell;

said metal shell having a predetermined area thereof provided with a hydrogen-permeable cadmium electro plating; and the metal surface under said plating being roughened to render the applied plate porous.

16. An electronic probe as in claim 15 wherein the metal shell is free of nickel plate.

17. A probe as defined in claim 15 wherein said area is in the form of a window delineated by a coating inert to liquids to be tested.

18. A probe as defined in claim 15 wherein said area is in the form of a window defined by a surrounding coating inert to liquids to be tested.

19. An electronic probe as defined in claim 15 in which said shell is composed of iron.

20. A method of determining the free amine content of a chemical composition which comprises the steps of:

mixing a measured amount of said composition with an excess of methylene chloride in solution form;

contacting a hydrogen permeable wall with said solution; and measuring the rate of flow of hydrogen through said wall.

21. A method as defined in claim 20 in which the surface of said wall contacted by said solution is a porous cadmium plated steel wall.

22. In a method of determining the porosity of a cadmium-plated surface of an object which comprises the steps of:

cadmium electro plating and otherwise treating the external surface of a vacuum tube having a hydrogen-permeable envelope to simulate the cadmium plated surface of said object;

immersing the treated portion of said envelope in a hydrogen-effusive liquid to cause hydrogen to flow through said envelope into said tube;

energizing electrode elements within said tube to cause an ion current to flow to one of said elements in accordance with the pressure of hydrogen gas within said envelopes; and measuring the rate at which said ion current changes while the envelope is immersed in said liquid.

References Cited by the Examiner

UNITED STATES PATENTS

| 2,443,600 | 6/1948 | Chester | 204—50 |
|---|---|---|---|
| 2,548,867 | 4/1951 | Chester | 204—50 |
| 2,648,220 | 8/1953 | Tiers | 73—53 |
| 2,729,098 | 1/1956 | MacKenzie et al. | 73—53 |
| 2,921,210 | 1/1960 | Schaschl et al. | 73—86 X |
| 2,946,952 | 7/1960 | Marsh et al. | 324—71 |

OTHER REFERENCES

Article: "Diffusion of Hydrogen from Water Through Steel," by Norton, F. J. in Journal of Applied Physics, vol. 11, No. 4, April 1940.

RICHARD C. QUEISSER, *Primary Examiner.*

JAMES J. GILL, *Examiner.*

EDWARD D. GILHOOLY, *Assistant Examiner.*